Nov. 17, 1936.    C. E. NELSON    2,061,003
LAWN MOWER
Filed Aug. 16, 1935
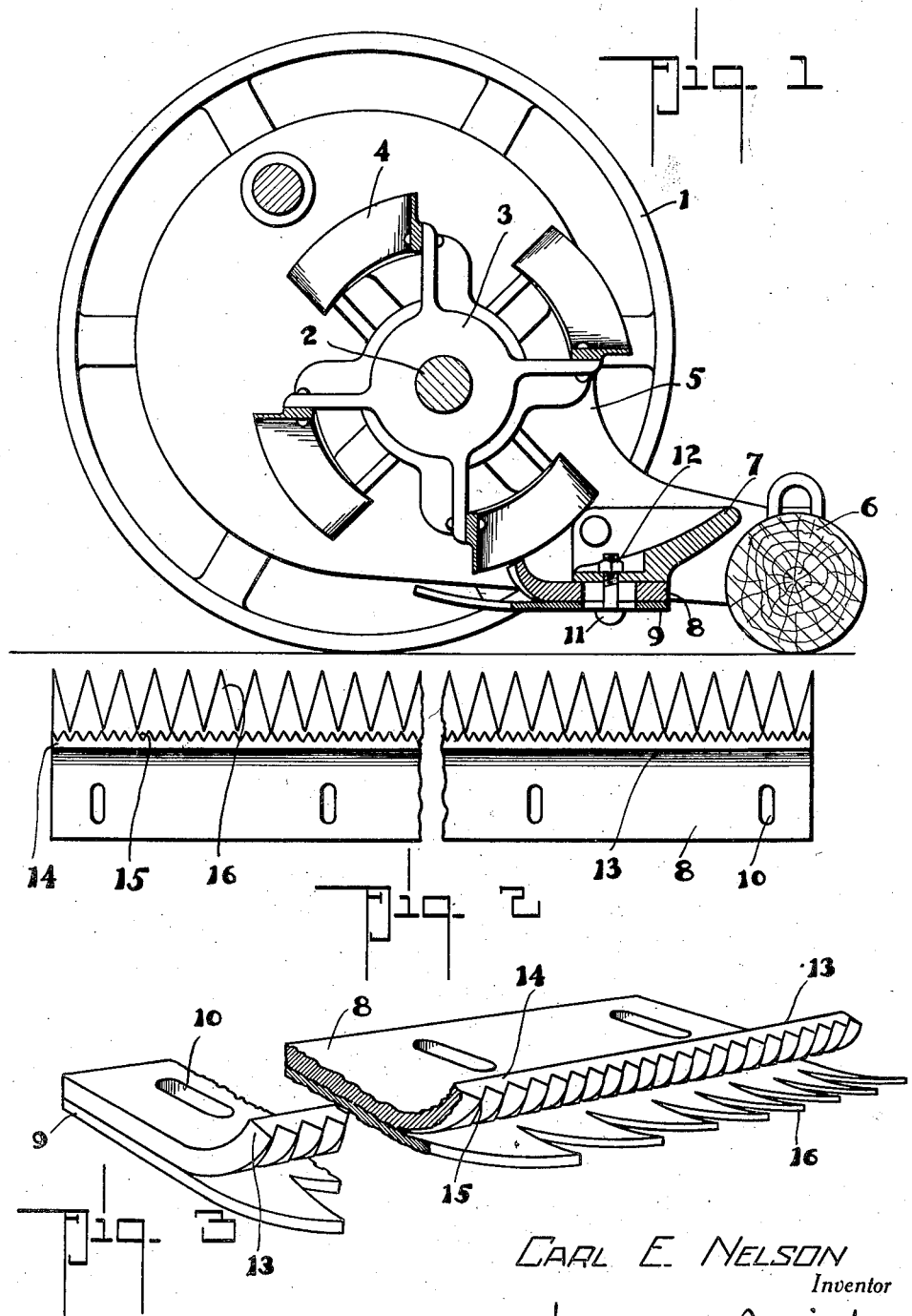
CARL E. NELSON
Inventor
By Herbert E. Smith
Attorney Patented Nov. 17, 1936

2,061,003

UNITED STATES PATENT OFFICE 2,061,003

LAWN MOWER

Carl E. Nelson, Moscow, Idaho

Application August 16, 1935, Serial No. 36,523

3 Claims. (Cl. 56—294)

My present invention relates to improvements in lawn mowers of the rotary cutting-reel type, wherein the cutting blades are spirally arranged to co-act with the cutter bar, and by abrasion, maintain the sharp cutting edges of the blades and bar in sharpened condition. The improvements of my invention may be embodied in the usual hand propelled and operated lawn mowers, or in power propelled and operated lawn mowers of the rotary reel type; or by suitable adjustments in mowers now in use, the cutter bar and auxiliary cutter plate involved in my invention may be substituted for well known types of cutter bars.

As is well known, under ordinary conditions, this type of rotary reel lawn mower is effective in cutting the fine, tender, blades of grass, but when coarse, heavy grass, and tough weeds are encountered by the usual rotary reel, the cutter fails to perform its functions, with the result that the parts are clogged, and the reel must be reversed in its rotary movement to free the clogging coarse grass or weeds from the machine.

By the combination with the lawn mower of my specially formed cutter bar and auxiliary cutting blade, the coarse grass and weeds are gathered and held or retained against lateral movement that would otherwise clog the reel, and the grass and weeds thus retained are in position to be cut by the action of the reel blades on the cutter bar.

My invention consists in certain novel features of construction and arrangements of parts as will hereinafter be more fully set forth and claimed. In the accompanying drawing I have illustrated one complete example of the physical embodiment of my invention wherein the parts are combined and arranged according to the best mode I have thus far devised for the practical application of the principles of my invention. It will be understood that changes and alterations may be made in the exemplifying structure of the drawing, within the scope of my claims, without departing from the principles of my invention.

Figure 1 is a transverse sectional view through a lawn mower equipped with the elements forming the improvements of my invention.

Figure 2 is a plan view, partly broken away for convenience of illustration, and showing the cutter bar and auxiliary cutter plate detached from the mower.

Figure 3 is an enlarged detail front perspective view, partly broken away, showing the cutting edge and the front guide-face of the cutter bar, and the auxiliary cutter plate.

In order that the general arrangement and utility of parts may readily be understood I have shown in Figure 1 so much of a lawn mower as is necessary to illustrate my invention. A usual supporting and traction wheel is indicated at 1, with the axle 2 on which the rotary cutting reel is mounted, and the reel comprises the spaced heads 3 and a number of spirally arranged cutting blades 4. The frame 5, supported on the axle is provided with the usual rear roller, 6, and usual means are employed for adjusting the frame and its reel with relation to the roller.

The cross bar 7, which forms a rigid part of the frame is located between the reel and the roller, and the cutter bar 8 and auxiliary cutting plate 9, are rigidly supported beneath the cross bar 7.

For the purpose of adjusting the cutter bar with relation to the rotary reel, the cutter bar and the auxiliary cutting plate are slotted as at 10, and bolts 11 are passed up through these slots, and through the cross bar, and nuts 12 on top of the cross bar are employed to clamp the cutter bar and auxiliary plate in adjusted position.

Preferably, the cutter bar is fashioned from a flat strip of metal, and then a flange 13 is formed in suitable manner and upturned from its front edge, so that the top face 14 of the flange forms a surface that is tangentially disposed with relation to the periphery of the rotary cutting reel, and the cutting edges of the blades 4 frictionally engage this tangential face or surface of the flange, to maintain the cutting edges in proper condition.

Before the flange is fashioned on the metal strip, the latter is grooved, notched, or serrated in suitable manner to form a series of notches or teeth 15 that extends from end to end of the cutter bar. These notches are V-shaped in cross section, and they taper from their maximum width at the face or edge 14 of the flange, down to zero, and flush with the under face of the cutter bar against which the upper face of the auxiliary cutter plate 9 is clamped.

The edges of these teeth 15 are sharp, and as seen in Figures 2 and 3, these teeth provide the cutter bar with a series of sharp serrations on the front edge of the top face of the bar which co-act with the spiral blades of the rotary reel for cutting the grass. The sharp edges of the serrations extend from the top face 14 down to the plane under surface of the cutter bar, and it will be apparent that as the top face of the cutter bar is gradually worn by frictional contact from the blades 4, these sharp teeth or serrations are always present for co-action with the blades.

These serrations also gather the blades of coarse grass and not only hold them erect so that they may be clipped by the cutting blades, but the serrations prevent the coarse grass-blades from being turned or twisted laterally by the blades 4, thus preventing clogging of the coarse uncut grass between the reel blades and the cutter bar.

To assist in gathering and holding erect the coarse grass so that it may be cut down, the auxiliary plate 9 is also fashioned with a front row of teeth 16 that are preferably slightly upturned, and located in advance of the serrated cutting edge of the cutter bar. These teeth may have sharpened edges so that they will clip off dandelions and other weeds, or coarse grass, before they are cut by the rotary reel, after which they are swept by the reel to the rear over the cross bar 7 and the roller 6.

Having thus fully described my invention, what I claim as new and desired to secure by Letters Patent is:—

1. The combination in a lawn mower with a rotary cutting reel having spirally arranged blades, of a cutter bar having a flat, continuous face extending the full length of the bar disposed tangentially of said blades, and said bar having front cutting teeth below of said face for co-action with the blades.

2. The combination in a lawn mower with a rotary cutting reel having spirally arranged blades, of a cutter bar having an upturned front flange formed with its continuous flat upper face disposed tangentially of the rotary reel, and the front face of said flange having a series of serrations terminating in V-shaped cutting teeth at said upper face.

3. The combination in a lawn mower with a rotary cutting reel having spirally arranged blades, of a cutter bar having an upturned front flange forming a continuous flat face, said flange having a series of serrations forming V-shaped teeth terminating at the upper tangential face of said flange, and an auxiliary cutting plate fixed beneath the cutter bar and having V-shaped teeth located in advance of the serrated flange.

CARL E. NELSON.